United States Patent
Voigt et al.

(10) Patent No.: US 6,941,247 B2
(45) Date of Patent: Sep. 6, 2005

(54) METHOD FOR MONITORING A CONTROL SYSTEM

(75) Inventors: Uwe Voigt, Jena (DE); Gunter Moehler, Jena (DE); Burkhard Goetz, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/731,593

(22) Filed: Dec. 7, 2000

(65) Prior Publication Data

US 2001/0021897 A1 Sep. 13, 2001

(30) Foreign Application Priority Data

Dec. 7, 1999 (DE) ......................................... 199 58 825

(51) Int. Cl.⁷ .............................................. G05B 19/00
(52) U.S. Cl. ........................... 702/188; 702/187; 700/3
(58) Field of Search .......................... 702/188, 40, 62, 702/123, 113–115, 177, 182, 183, 187, FOR 131, FOR 134, FOR 135, FOR 154, FOR 170, FOR 171, FOR 103, FOR 104, FOR 113, FOR 123, FOR 124; 250/311, 201.3, 201.2, 559.04–559.08; 356/904; 359/368, 364, 382; 700/1–3, 8–10, 14, 19, 20, 12, 13, 26, 27, 108, 275, 277, 287, 296, 302, 306; 340/3.13, 213.31, 3.32, 3.51, 3.9, 286.01; 382/128, 133

(56) References Cited

U.S. PATENT DOCUMENTS

| | | | | |
|---|---|---|---|---|
| 4,539,655 A | * | 9/1985 | Trussell et al. | 340/825.01 |
| 5,557,097 A | * | 9/1996 | Ortyn et al. | 250/201.3 |
| 5,748,468 A | | 5/1998 | Notenboom | 700/3 |
| 5,884,072 A | * | 3/1999 | Rasmussen | 700/2 |
| 5,966,304 A | | 10/1999 | Cook | 700/82 |
| 5,978,352 A | * | 11/1999 | Imaizumi et al. | 307/39 |
| 6,272,235 B1 | * | 8/2001 | Bacus et al. | 382/133 |
| 6,330,349 B1 | * | 12/2001 | Hays et al. | 382/128 |

FOREIGN PATENT DOCUMENTS

| | | | |
|---|---|---|---|
| DE | 30 43 894 | * | 12/1989 |
| DE | 196 35 233 A1 | * | 3/1998 |
| DE | 195 20 744 C2 | * | 9/1999 |
| EP | 06 04 091 A2 | * | 6/1994 |
| JP | 08106306 | * | 4/1996 |
| JP | 10254507 | * | 9/1998 |
| JP | 11219207 A | * | 8/1999 |

* cited by examiner

Primary Examiner—Hal Wachsman
(74) Attorney, Agent, or Firm—Rees Smith LLP

(57) ABSTRACT

A method for monitoring a control system is disclosed comprising a plurality of control units, preferably for an optical measurement device or observation device. In a method of this type, it is provided that at least one control unit with master capability is incorporated in the communication between the control station and the rest of the control units and communicates with at least one of the control units for purposes of detecting status data and communicates with the control station for purposes of conveying the detected status data. In this way, polling for determining the current status is not the exclusive responsibility of the control station but, rather, can be taken over—at least partially or so as to be limited to determined processes—by the control unit with master capability enabled for this purpose. A control system for accomplishing the method is also disclosed.

5 Claims, 5 Drawing Sheets

METHOD FOR MONITORING A CONTROL SYSTEM

BACKGROUND OF THE INVENTION a) Field of the Invention

The invention is directed to a method for monitoring a control system comprising a plurality of control units, preferably for an optical measurement device or observation device.

b) Description of the Related Art

In the case of complex measurement devices or observation devices, it is known to carry out the various device settings depending on the measurement or observation task at hand by means of actuating or adjusting units which are driven by electric motor. For example, commands are entered via a computer keyboard, evaluated in a computer serving as control station, and conveyed to the respective adjusting units. In high-quality microscope systems, for example, this relates to the adjustment of revolving lens turrets or objective turrets, field diaphragms and aperture stops, reflector turrets, variable condensers, cross-slide stages for X- and Y-displacement vertical to the microscope beam path, and for displacement in the Z-coordinate. Electronically controllable adjusting movements in the illumination configuration are also common.

In order to be able to use all possible device configurations without restriction, it has proven successful to actuate the adjusting units through control circuits, wherein a control circuit together with an associated adjusting unit generally forms a separate control unit. All control units and the control station form a control system and are linked via data lines for purposes of transmitting information.

The transmission of information is often carried out between the control station, which functions as main computer or master, and the control units based on the master-slave principle, as it is called, i.e., commands are sent from the control station to the slaves. The slaves execute these commands and, based on the principle of "polling", as it is called, transmit the status achieved in the course of executing the command, e.g., the adjusting position that has been reached, in response to inquiries which are directed in timed intervals from the control stations to the slaves. In this way, the control station gathers the status information of all slaves and accordingly obtains an illustration of the situation within the entire control system or in the device.

A disadvantage in this previously known procedure consists in the fact that the transmission of commands to the slave, the initiation of adjusting processes and the inquiries and reports relating to the execution of the command takes a relatively long time. For example, when initiating an adjusting process lasting one to two seconds, the control station is occupied during this time with polling the status until, finally, it is reported that the desired adjusting position has been achieved or the adjusting process has been successfully concluded.

Since the time of the conclusion of an adjusting process must also often be detected by the control station, the communication between the control station and slave takes place for the entire duration of the adjusting process until the inquiry results in a "ready" state and the corresponding time can be recorded.

For example, when the report concerning the conclusion of the adjusting process for an objective turret has been received, the next process, e.g., changing a field diaphragm, can be initiated. But the control station is then occupied again until this process is also terminated, and only then can the next adjusting process be initiated.

The greater the quantity of communication units associated with a control system of this type and connected with the control station, the greater the burden on the control station and the information paths. This procedure of continuous inquiry and response between the control station and slaves has accordingly proven to be disadvantageous with respect to the desired effective utilization of existing capacities of the control station and communications paths.

OBJECT AND SUMMARY OF THE INVENTION

Based on this prior art, it is the primary object of the invention to provide a control system in which the capacity of the control station can be utilized efficiently.

According to the invention, it is provided in a method of the type described in the above that at least one microprocessor unit with master capability is incorporated in the communication between the control station and the control units and communicates with at least one of the control units for purposes of detecting status data and communicates with the control station for purposes of conveying the detected status data.

In this way, it is achieved, for example, that the polling for determining the status of a control unit achieved in a particular instance during execution of a command is not the responsibility exclusively of the control station but can be taken over—at least periodically or so as to be limited to certain processes—by the microprocessor unit with master capability. Thus, communication does not take place exclusively between the control station and control units; rather, polling is carried out by the microprocessor unit. It is only when an adjusting process is concluded and the microprocessor unit has recorded the end of the adjusting process that the latter automatically transmits a corresponding report to the control station.

The control station is accordingly only informed of the results of the conclusion of the adjusting process which are relevant for the control station. In other words, from the time that the command for the execution of a determined adjusting process is initiated to the time that it is reported to the control station that this command has been executed, it is no longer necessary for the control station to poll during this time; rather, its full capacity is available for other jobs during this time. The capacity gained in this way in the control station can be utilized, for example, for process-related computing processes or for generating a visual display of the overall status achieved at that moment in the control system.

One of the substantial advantages of the invention consists in that control systems of older equipment already in use in which, for example, only one control station with master capability is connected with a plurality of control units without master capability, i.e., slaves, can be upgraded by incorporating an additional microprocessor unit in the communications process in that the polling function is transferred, according to the invention, to the microprocessor unit with master capability. Thus, polling by the control station can be dispensed with and the communications capacity can be structured more efficiently.

Of course, in this regard it is also possible and also lies within the scope of the invention to incorporate a microprocessor with master capability into the control system instead of a slave, as was previously the case, and to assign to this microprocessor some of the functions of the control station in the manner described above, namely, for example, polling. However, the recommended variant consists in leaving the existing control systems in their configuration with the existing slaves and adding one or more microprocessor units with master capability in order to achieve the advantages mentioned above.

Further, in an advantageous construction of the invention it is possible that the transfer of functions of the control station to a microprocessor unit with master capability which already exists or is to be added later is carried out within a limited time period, wherein the function is transferred again to the control station or is automatically taken over by the latter after the expiration of a predetermined time period.

In control systems in which there are not only exclusively control units without master capability, but also control units with master capability, functions of the control station, e.g., polling, are transferred according to the invention to one or more of these control units with master capability either permanently or for a limited time. With this transfer of function, these control units are capable of communicating with at least one of the control units without master capability for purposes of detecting the status data and communicating with the control station for purposes of conveying the status data detected in this way.

In this case, the advantage consists in that no additional microprocessor units need to be added to an existing control system; rather, an improved utilization of functionality can be achieved simply by transferring functions. The transfer of capability of detecting status data from the control station to one or more control units with master capability can be carried out, for example, by downloading corresponding executable programs from the control station to the control unit provided for that purpose.

In a constructional variant, it is possible that assigning and/or taking away the capability of detecting status data using existing communications paths from the control station to the respective control unit is carried out by activating or deactivating executable programs which are already stored in operative manner in the respective control unit. This has the advantage that the control station transfers jobs such as polling to selected control units only when required, for example, when the capacity of the control station is overburdened. This operativeness of the respective control unit is deactivated again when the required situation no longer exists.

Of course, it is also possible to transfer the functionality from the control station to selected control units not only depending on the burdening of the information paths, but also whenever special adjusting processes are to be initiated and monitored, especially, for example, stage adjustments in the X- and/or Y-direction, because these adjusting processes are relatively time-consuming and the control station would be unnecessarily blocked by polling for the duration of execution.

In a particularly preferred construction of the invention, the microprocessor unit with master capability is always only enabled to detect status data when changes in status occur in the associated control units. In this way, for one, polling between the enabled control unit and the associated control units without master capability is restricted to a minimum. For example, it is possible for an adjusting command to be directed from the control station to the executing control unit, but the message concerning the end of the adjusting process is conveyed to and recorded by the enabled control unit, for example, and not by the control station. The status data which is recorded and gathered in this case can be transmitted to the control station when called up or, in another preferred construction of the invention, at predetermined time intervals.

In all of the variations of the invention mentioned above, the communication between the control station and the control units with and without master capability is restricted to a minimum. The efficiency of the system in its entirety, but especially of the control station, is increased and real-time capability is improved in that a two-point connection no longer determines the through-capacity for the information flow. By means of the bus, which is substantially more efficient, the information is initially exchanged only between the control units and only the information that is significant for the control station is conveyed to the control station, or vice versa, via the two-point connection which connects the control station with one of the control units. In this way, the control station is always informed about the status of the entire system without having to carry out the polling itself.

The invention is further directed to a control system which is provided for carrying out the method steps mentioned above, preferably a control system for an optical measurement device or observation device comprising a plurality of control units and outfitted with a control station which, when required, generates a map of the overall status of the control system based on status data of the individual control units, wherein, according to the invention, at least one of the control units has the capability of detecting and/or automatically assessing status data of associated other control units and transmitting the detected status data and determined assessment to the control station.

The invention will be described more fully with reference to an embodiment example.

DESCRIPTION OF THE PREFERRED EMBODIMENTS

Figure 1:
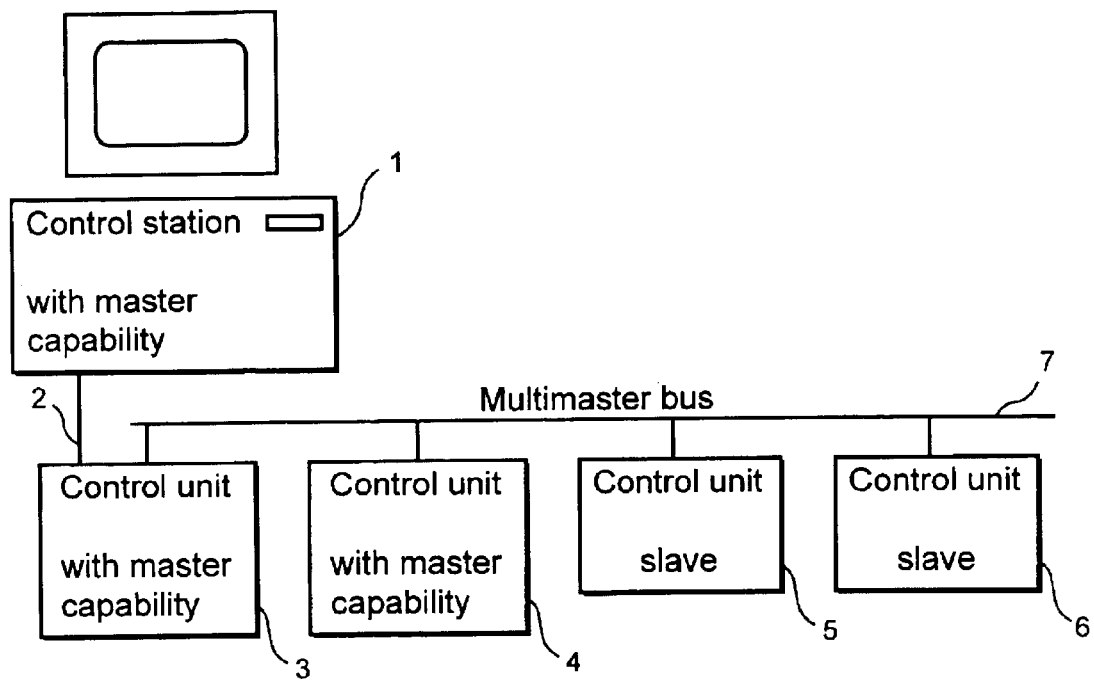
FIG. 1 shows a schematic view of a control system to which the invention is directed.

FIG. 1 shows a control system in which a control station 1 with master capability is connected via a two-point connection 2 to a control unit 3 with master capability. The control system comprises additional control units 4, 5 and 6, including, for example, a second control unit 4 with master capability and a control unit 5 and 6 without master capability. The control units 3 to 6 and all other control units which may possibly be associated with the control system, but are not shown, are linked via a multimaster bus 7.

The control units 5 and 6 without master capability are intelligent communications control circuits in the form of slaves which only receive commands from the control station 1, convey these commands as control commands to associated adjusting devices and inform the control station 1 of the execution, completion or progress of the adjusting command via the reverse information path.

It is also possible for the control units 3 and 4 with master capability to receive commands from the control station 1 and convey the commands to adjusting units. In this case, the completion message relating to the executed adjusting command is likewise conveyed to the control station via the reverse information flow.

Figure 2:
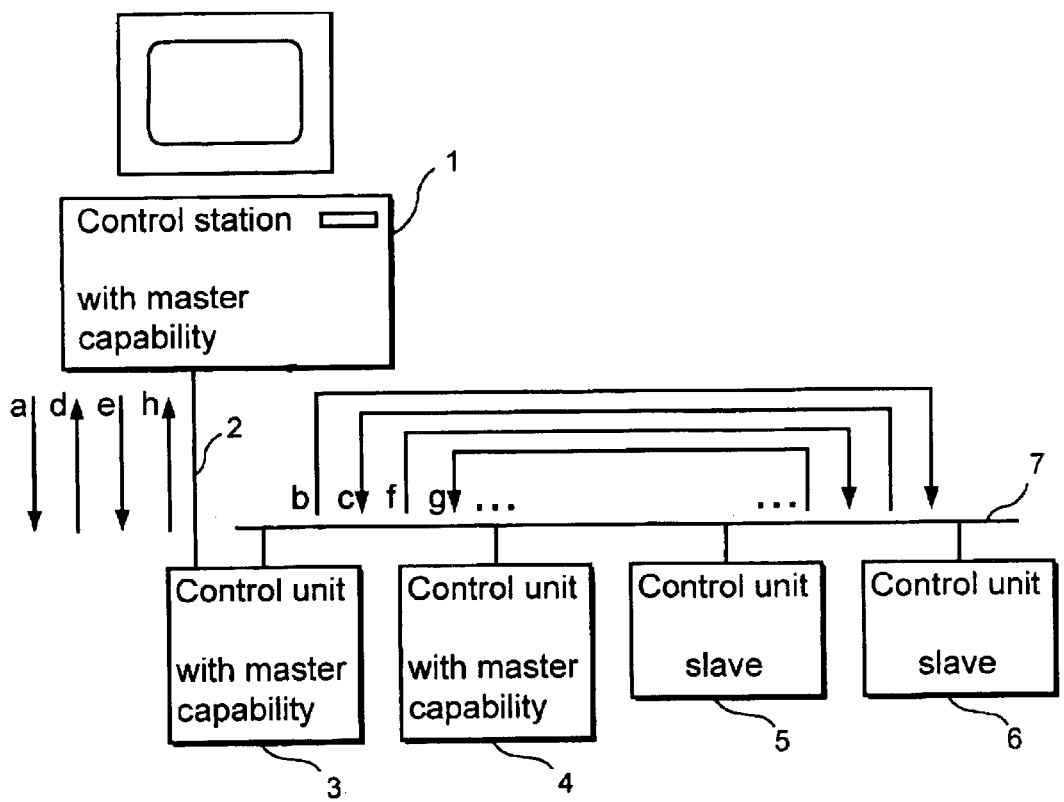
FIG. 2 shows the information flow during polling between the control station and the control units.

When the control station 1 communicates in this manner with the control units 3 to 6, this results in an information flow such as is shown, for example, in FIG. 2. In principle, the information transfer between the control station 1 and control units 3 to 6 takes place by means of the transfer of address-oriented message packets, wherein the target address and source address are transmitted. A message sent by the control station 1 is conveyed via the two-point connection 2 and control unit 3 to the destination defined by the address. The control unit 3 functions as a gateway and stores the source address of the message. If the message is directed, for example, to control unit 6, the latter answers the message with updated target and source addresses, control unit 3 detects the previously stored address and conveys the response of control unit 6, which reaches control unit 3 via the bus 7, to the control station 1 via the two-point connection 2.

The control station 1 has the special feature that the relevant states of the total system converge therein and are made visible by it, so that it is possible to control and monitor the total process from the control station 1.

Control systems of this kind are used, for example, in microscope systems, wherein, for example, control unit 3 is connected with an adjusting device for an objective turret, control unit 4 is connected with an adjusting device for the microscope stage in the Z-direction, control unit 5 is connected with an adjusting device for stage movements in the direction of coordinate X, and control unit 6 is connected with an adjusting device for stage movements in the direction of the Y-coordinate. This list, which is given by way of example, does not include the entire control system of a complex modem microscope system. The selection made here is used only for purposes of illustrating the method according to the invention.

For example, the following sequence of movements is possible: When the user of the microscope actuates a "rotate objective turret" key, a message is first sent to the control unit 4 from the control station 1 and an actuating command for the stage control is accordingly triggered, resulting in a lowering of the stage in the Z-direction. When the desired stage position is reached, the rotation of the objective turret to the next position is caused by a message which is sent by the control station 1 and, in this case, is directed to control unit 3. After this actuating movement has been completed, the control station 1 again sends a command to control unit 4 and the Z-adjustment is accordingly initiated depending on the selected magnification. Stage movements in the X-direction or Y-direction are then initiated by control commands to control units 5 and 6 and the position of the measured object is accordingly corrected.

After one of these adjusting commands is executed, the control station 1 receives the information from the corresponding control unit 3, 4, 5 or 6 that the actuating command has been carried out. Based on this information, the control station 1 is at the same time able to creating a total picture of the status in the control system and to visually display this status, for example, in that the achieved magnification, the adjusted objective, the adjusted stage position, etc. are displayed on a monitor.

In conventional control systems, polling between the control station 1 and the respective control unit 3, 4, 5 or 6 being addressed is required in order for the control station 1 to detect this total picture. For example, when command a, "lower stage in Z-direction", is sent to control unit 4 (see FIG. 2), the control station 1 repeatedly asks at predetermined time intervals during polling whether the actuating command has been executed and whether the stage has reached the given Z-position. The message transmission is indicated symbolically in FIG. 2 by arrows which also indicate the direction of the transmitted message.

The resulting information flow further shows that after the transmission of command a from the control station 1 to the gateway (namely, control unit 3) via the bus 7, a command b is sent to control unit 4 which generates the adjusting command to the stage control after receipt of command b. The control station 1 carries out its monitoring function by calling up the oppositely directed information c which contains the current Z-position of the stage. Information c is first received by control unit 3 and is conveyed from the latter, without valuation, as information d to the control station.

The control station 1 now sends an inquiry e which likewise first reaches control unit 3 via the two-point connection and is transmitted by the latter, without valuation, as inquiry f to control unit 4. In the latter, a response g is triggered which is directed in turn by control unit 4 via the bus 7 first to control unit 3 and then via the two-path connection 2 to the control station 1 as information h.

If information h contains the message that the intended stage position in the Z-direction has been reached, no further inquiry is sent to control unit 4; rather, the command for further rotation of the objective turret to the new position is sent to control unit 3. In this case, polling is carried out in an analogous manner via a plurality of inquiries until the completion report has also arrived at the control station 1. The command is then sent to control unit 5 for purposes of stage adjustment in coordinate X with subsequent polling, and so on.

It can easily be seen that the two-point connection 2 between the control station 1 and control unit 3 is very highly loaded in this procedure and, because of this, every information flow is time-dependent and the communications speed in the entire system is kept within limits. Further, the control station 1 is not available for other purposes during this polling.

In order to change this and for a more efficient structuring of the process for monitoring this control system comprising a plurality of control units, it is provided according to the invention to enable, e.g., control unit 3 to carry out polling and request the current status information from control units 4, 5 and 6.

Figure 3:
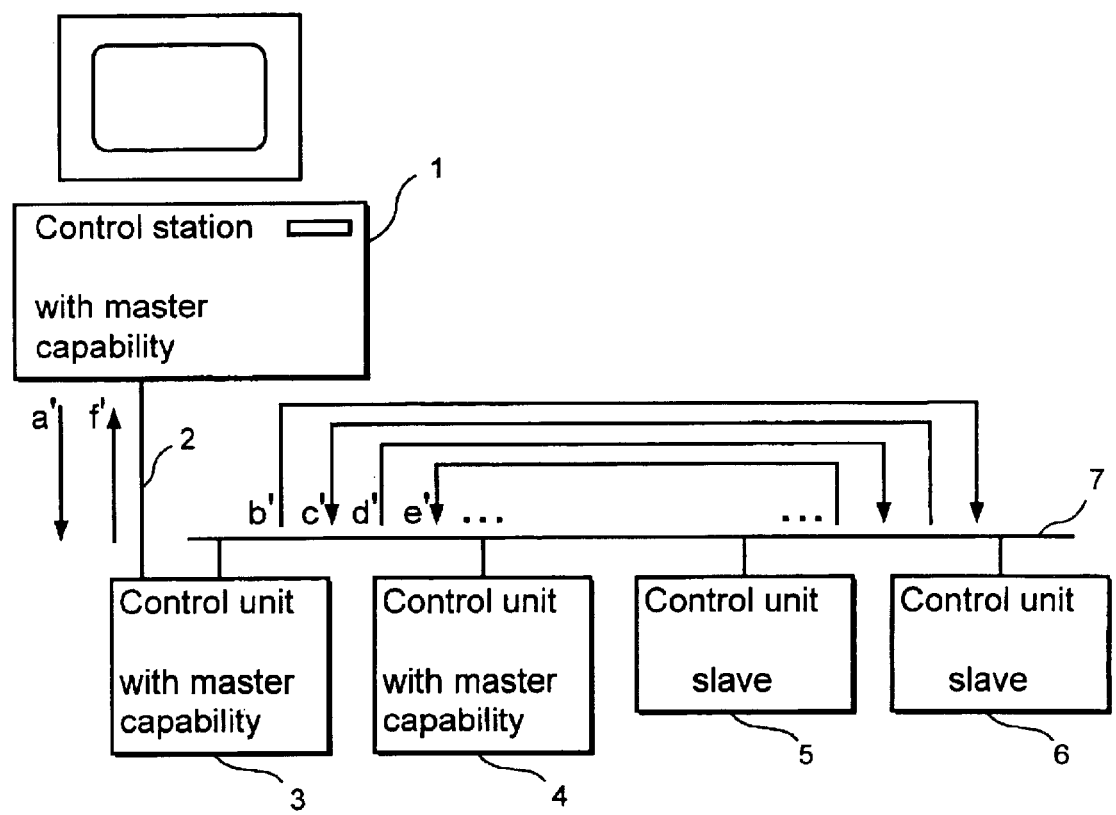
FIG. 3 shows the flow of information that is substantially more advantageous by means of transferring the status determination (polling) of a slave to a control unit with master capability.
Figure 4:
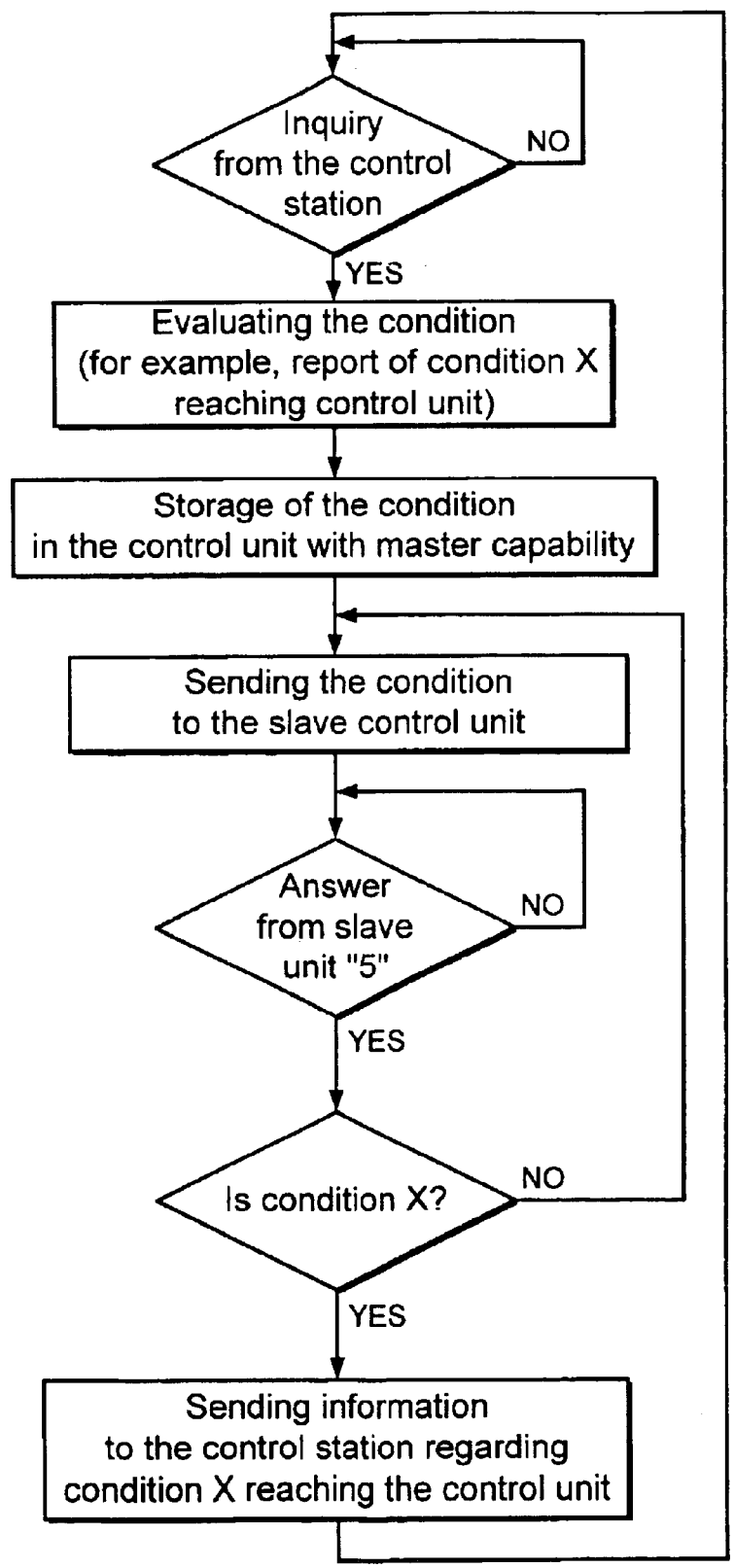
FIGS. 4 and 5 show a flowchart from the perspective of a "control unit with master capability"(3, 4)
Figure 5:
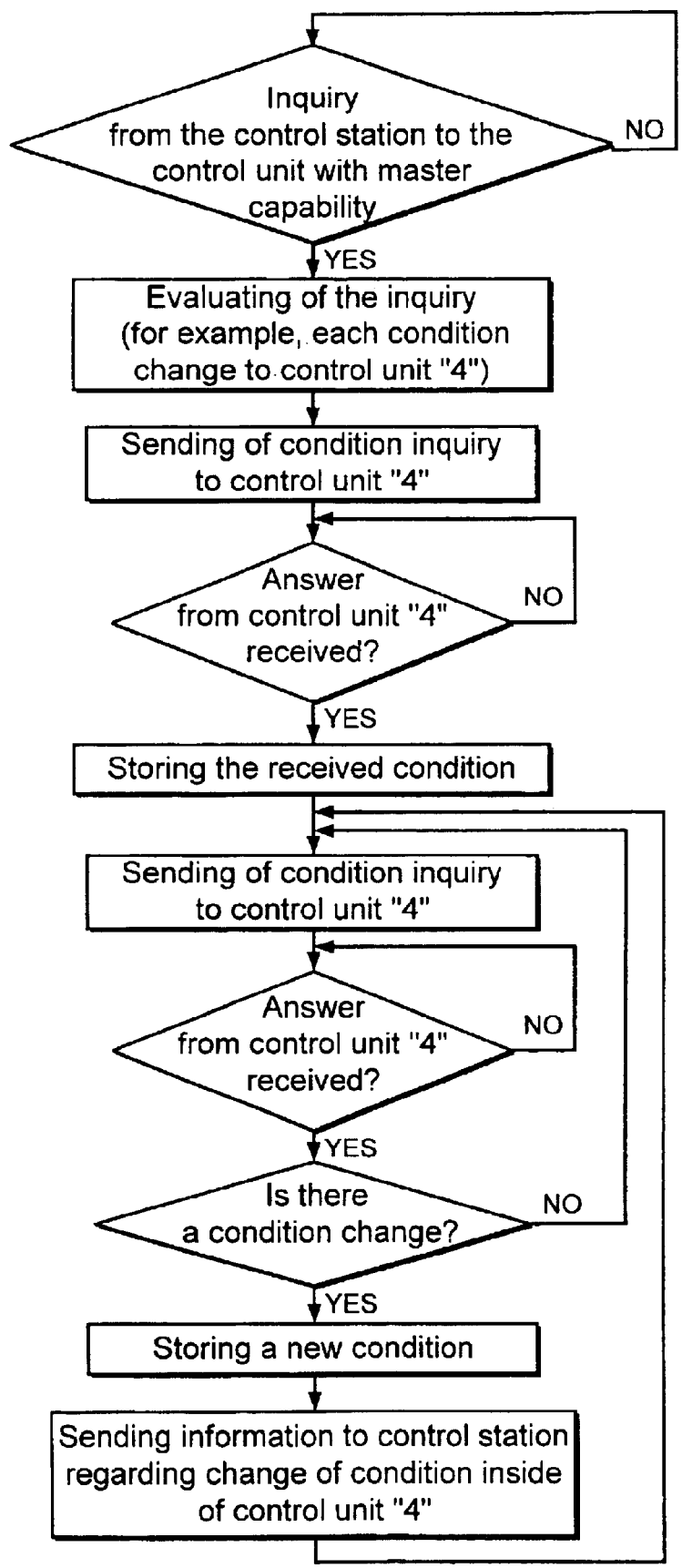
Figure 6:
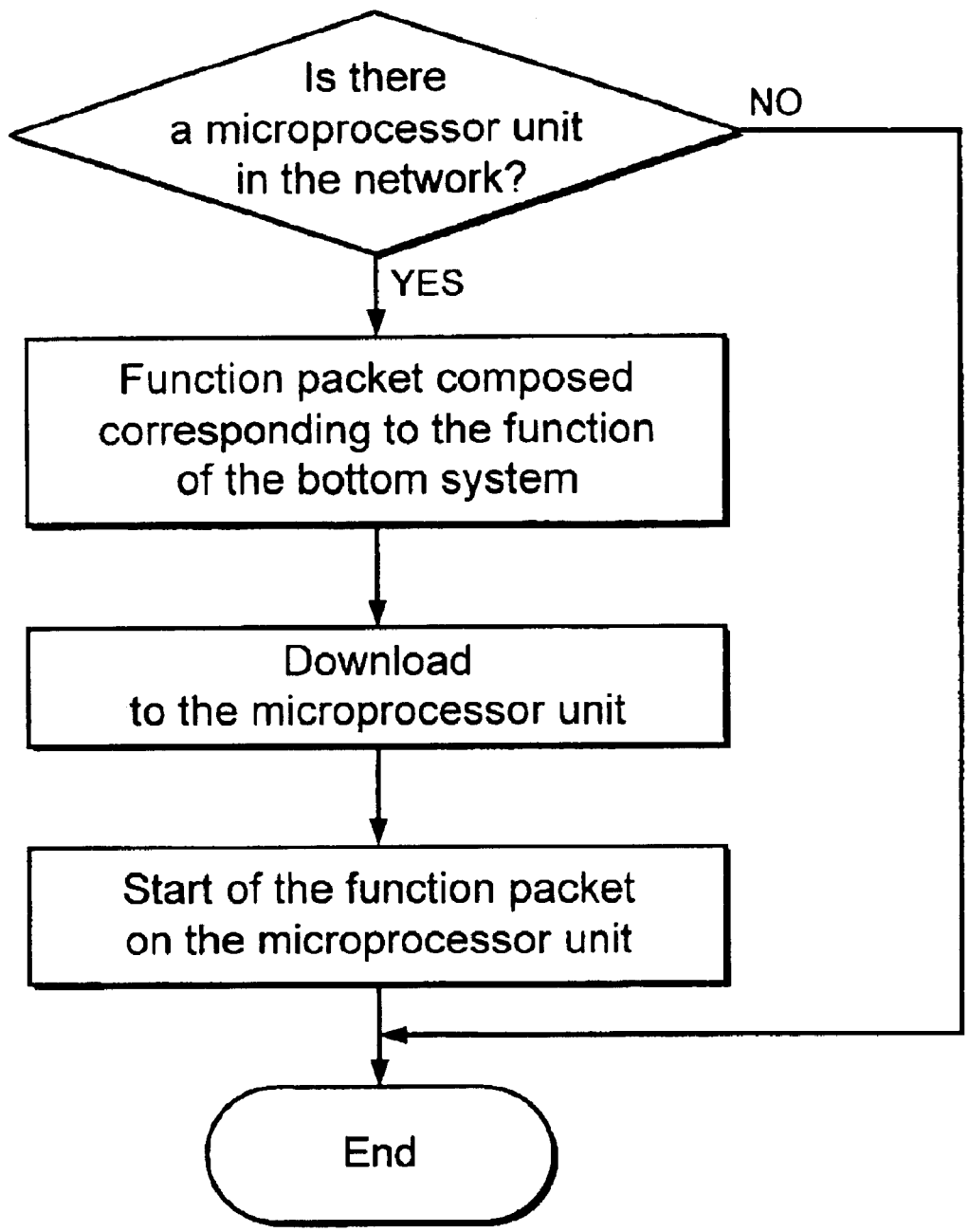
FIG. 6 shows a flowchart from the perspective of a "control station 1".

This results in an information flow such as that shown, for example, in FIG. 3. When the control station 1 sends command a', "lower stage in Z-direction", to control unit 4, the control unit 3, still serving as gateway, registers the target address and source address and sends command b' to control unit 4. Since the control unit 3 is now made capable of polling, it receives information c' from the control unit 4 which contains a status report for the stage position that has been reached in the Z-direction. After a predetermined timing signal, control unit 3 directs a response d' to control unit 4 and, with response e', again obtains status information on the stage position reached in the Z-direction. This is continued until information containing the status report "predetermined stage position in Z-direction has been reached" reaches the control unit 3. This is recorded by control unit 3 and a corresponding message f' is then conveyed to the control station 1.

Therefore, as in the first example above which shows the prior art, control station 1 has the status information "predetermined stage position in Z-direction has been reached", and the two-point connection 2 was burdened to a substantially smaller degree during polling.

Polling takes place between the enabled control unit 3 and control units 5 and 6 in an analogous manner during the stage adjustment in the X- and Y-direction.

The control station 1 and two-point connection 2 are accordingly available for other jobs during the polling between control unit 3 and the rest of the control units 4, 5 and 6. Further, the information flow within the entire control system requires significantly less time.

While the foregoing description and drawings represent the present invention, it will be obvious to those skilled in the art that various changes may be made therein without departing from the true spirit of the present invention.

REFERENCE NUMBERS 1 control station with master capability
2 two-point connection
3, 4, 5, 6 control unit
7 multimaster bus
a, a', b, b' command
c, c', d information
d', e inquiry
e' response
f inquiry
f' message
g response
h information

What is claimed is:

1. A control system suitable for controlling an optical measurement or observation device having a plurality of adjustable elements, the control system comprising:
   a plurality of control units with each controlling an associated adjustable element;
   a central control station having a master capability to control the adjustable elements through the control units by issuing adjustment commands to and assessing status data from the plurality of control units; and
   at least one of the plurality of control units having a processor with a master capability of:
      assessing status data of other control units so as to offload the work of assessing status data from the central control station; and
      transmitting the assessed status data to the central control station.

2. The control system according to claim 1, wherein the central control station controls offloading of the work of assessing status data of other control units by activating or deactivating an executable program stored in the at least one control unit.

3. The control system according to claim 1, wherein the status data assessed by the at least one control unit with the master capability are transmitted to the central control station at predetermined time intervals.

4. The control system according to claim 1, wherein an executable program that assesses the status data of the control units is downloaded from the central control station and stored in the at least one control unit with the master capability to offload the work of assessing the status data.

5. The control system according to claim 1, wherein the work of assessing status data that has been offloaded from the central control station includes repeatedly polling at least one other control unit and receiving an indication from the at least one other control unit that the adjustment command has been completed.

* * * * *